Inventor
ALAN ARNOLD
JOHN BAIRD CHILDS
KENNETH WILLIAM FFITCH

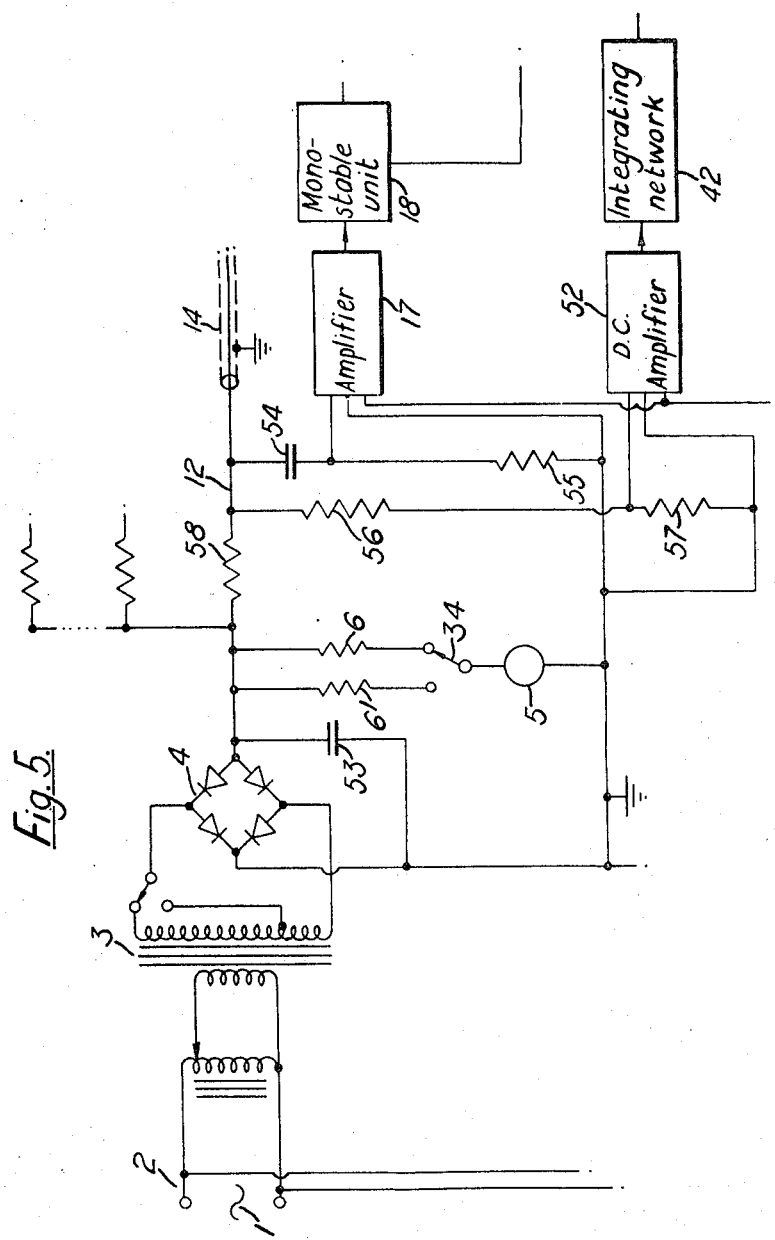

# United States Patent Office 3,548,302
Patented Dec. 15, 1970

3,548,302
APPARATUS FOR DETECTING FAULTS IN THE INSULATION COVERING OF INSULATED ELECTRIC CONDUCTORS INCLUDING MEANS FOR CAUSING A FLUCTUATING CURRENT TO FLOW THROUGH A BARE PORTION OF THE INSULATION
Alan Arnold, Wembley, Middlesex, John Baird Childs, London, and Kenneth William Ffitch, Uxbridge, Middlesex, England, assignors to British Insulated Callender's Cables Limited, London, England
Filed July 9, 1968, Ser. No. 743,372
Claims priority, application Great Britain, July 10, 1967, 31,580
Int. Cl. G01r 31/12
U.S. Cl. 324—54                        10 Claims

ABSTRACT OF THE DISCLOSURE

A pinhole counter for testing insulated wire is modified to make it capable of detecting and indicating unacceptable lengths of bare conductor as well as counting pin holes and indicating when there are an unacceptable number of pinholes in a predetermined length of wire. The test potential applied to the conductor via an electrode past which the wire moves is one which, in the absence of a fault current, is substantially constant and which causes a detectable fault current pulse to flow through any pinhole passing the electrode and a detectable fluctuating fault current comprising a series of pulses to flow through any bare portion passing the electrode.

---

Figure 1:
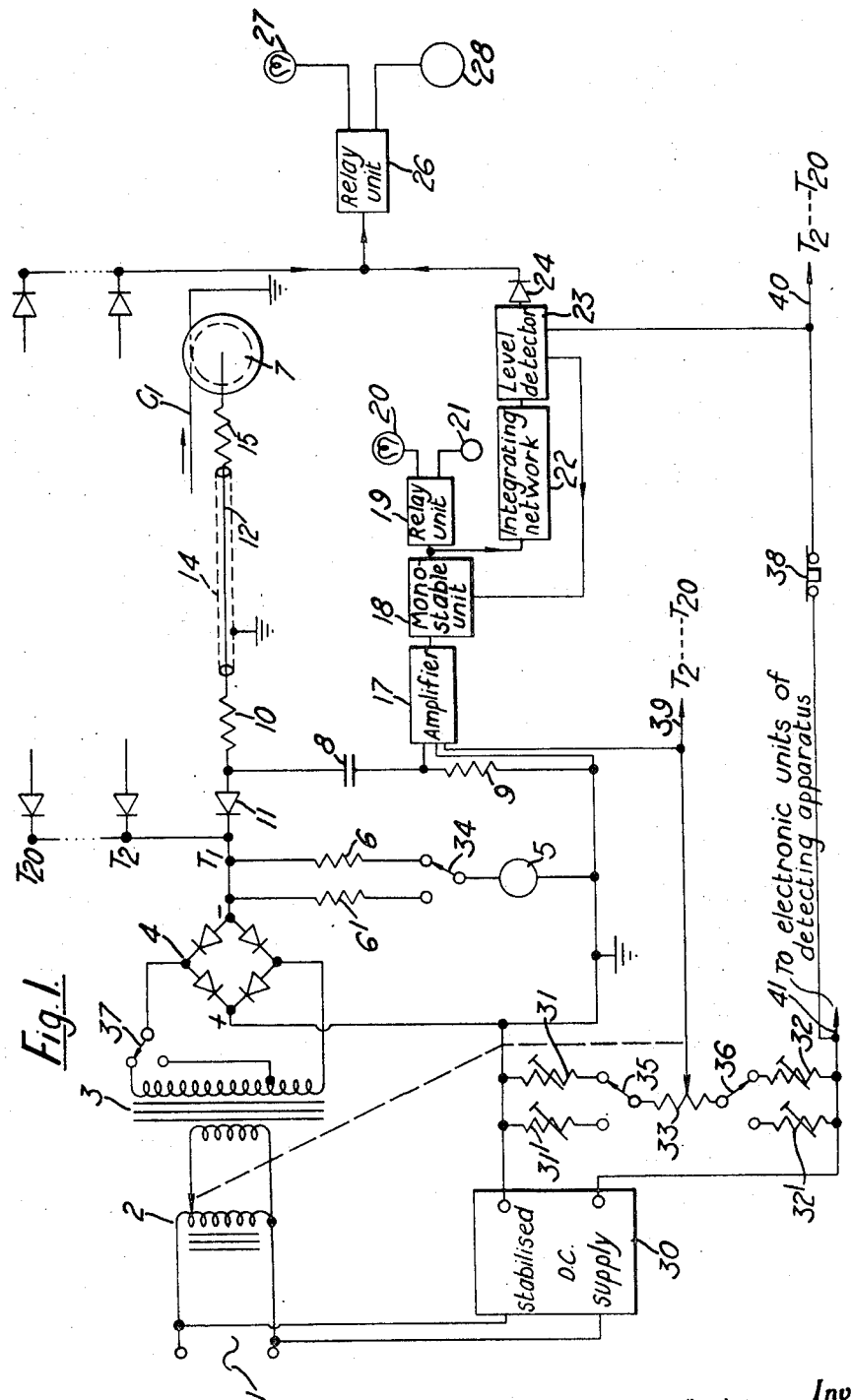

This invention relates to a method of and apparatus for detecting faults in the insulating covering of insulated electric conductors. The invention is particularly, but not exclusively, concerned with the detection of faults in enamelled wires or strip but it is to be understood that the invention can also be applied to the detection of faults in other forms of insulated elongated conductors, for example conductors in which the insulating covering is of a rubber, plastics or like material.

Although, as indicated, the invention is widely applicable it will for convenience be described with reference to the detection of faults in enamelled wires.

Enamelled wire is used in large quantities in the manufacture of coils for use in electric apparatus, such as transformers and dynamoelectric machines. When manufacturing enamelled wire it is difficult to ensure that there are no small holes or voids in the enamel coating, usually called and hereinafter referred to as "pinholes," but because in the manufacture of coils of enamelled wire it is very unlikely for pinholes in the enamel coatings of adjacent turns of wire to coincide and so cause a short circuit, a predetermined number of pinholes in a given length of wire is tolerated. Consequently the enamelled wire manufacturer is generally required to guarantee that in a given length of wire of any consignment the number of pinholes in the enamel coating does not exceed an agreed maximum. It is also difficult to avoid the occasional instance when the enamel fails to adhere to or is inadvertently removed from a part of the wire thereby resulting in an unenamelled or bare portion of wire that is longer than a pinhole. Wire having one or more such longer unenamelled or bare portions of wire along its length is generally unacceptable because the likelihood of such a bare portion in one turn of a coil coinciding with a pinhole in the enamel coating of an adjacent turn is increased to an undesirable extent. In order to meet these requirements it is necessary for the enamelled wire manufacturer to have means for detecting and counting the number of pinholes in the enamel coating of a wire after the enamelled wire has emerged from the enamelling plant so that a check can be made that the number of pinholes per given length does not rise above the specified maximum and also to have means for locating any longer bare portions of the wire in order that they can be rectified or eliminated.

It is an object of the present invention to provide a method of and apparatus for simultaneously counting pinholes and detecting bare portions in the insulating covering of an insulated electric conductor as it advances in the direction of its length.

In the method in accordance with the invention the insulated conductor is passed in contact with or in close proximity to an electrode and the conductor and/or electrode is connected to a source of potential which, in the absence of a fault current, is substantially constant and which causes a detectable fault current pulse to flow through any pinhole passing the electrode and a detectable fluctuating fault current comprising a series of pulses to flow through any bare portion passing the electrode, counting the number of pulses caused by pinholes, counting the pulses of the series of pulses generated by the fluctuating current flowing through bare portions, and indicating when pulses representing an unacceptable number of pinholes during the passage of a predetermined length of conductor and an unacceptable length of bare conductor are received.

The source of potential may be smoothed D.C. potential derived from a fluctuating D.C. source but it is preferably a smoothed D.C. potential derived from an A.C. source.

The invention includes apparatus for carrying out this method and the preferred apparatus comprises a plurality of test channels fed from a common source of potential. Preferably also the means in all the test channels for counting pulsees caused by pinholes and measuring the duration of current flowing through bare portions are connected to additional visual and/or audible indicator that is common to all test channels.

Actuation of the common indicator indicates that a detector in one of the test channels has received signals representing an unacceptable number of pinholes and/or length of bar conductor during the passage of a predetermined length of conductor and the indicator connected to that detector indicates the particular channel through which the unacceptable conductor is passing.

We prefer to use for the test voltage a fluctuating D.C. voltage reduced, when no fault current is flowing, to a smoothed D.C. voltage by means of a capacitor which is effectively connected across the voltage source and which has a capacitance insufficient to maintain a smoothed D.C. voltage when a detectable current flows through a fault in the insulating covering. In place of the smoothing capacitor a smoothing circuit of any other suitable form may be used.

In our preferred form of apparatus the detector of each test channel incorporates a relay unit which, on flow of current through a pinhole, causes the audible and/or visual indicator connected to the detector to actuate momentarily and causes a counter to record a pinhole, and incorporates a storage device which counts both the pulses caused by pinholes and the pulses of a series of pulses flowing through bare portions and which, when an unacceptable number of pulses in a given length of conductor has been received, both causes the relay unit to lock and effect continuous operation of the indicator and actuates the indicator common to all test channels. The detector may also incorporate a second storage device which counts only the pulses of a series of pulses flowing through bare portions and which, when an unacceptable number of pulses in a given length of conductor due to bare portions has been received, both causes the relay unit to lock and effect continuous operation of the indicator and actuates a separate indicator, preferably common to all channels where there is more than one, which serves to signify that the fault is at least one portion of bare conductor.

The apparatus may be in the form of a portable testing device and in this case it may be convenient to employ a battery source for the test voltage. If, as is preferred, a fluctuating D.C. voltage is used as the potential source, it can then be provided by a suitable oscillator circuit driven by the battery and feeding a high voltage transformer and rectifier system.

The invention will be further illustrated by a description, by way of example and with reference to the accompanying diagrammatic drawings, of five forms of apparatus for simultaneously counting pinholes and detecting bare portions in the insulating coverings of twenty insulated electric conductors.

FIG. 1 showing our preferred apparatus, and

FIGS. 2 to 5 showing respectively four possible modifications to the apparatus of FIG. 1.

The apparatus shown in FIG. 1 comprises twenty similar test channels $T_1 \ldots T_{20}$ of which, for the sake of clarity, only $T_1$ is illustrated in detail. All of the test channels $T_1 \ldots T_{20}$ are fed with a fluctuating D.C. test voltage from a bridge rectifier 4 which is connected to the output of a high voltage transformer 3 which is itself fed by a variable transformer 2 connected across a source of A.C. supply 1. The pulse frequency of the fluctuating D.C. output is dependent on the frequency and the number of phases of the A.C. supply 1 and on the rectifier circuit 4 employed. We prefer to use a single phase mains supply and a bridge rectifier to give a D.C. output which fluctuates at twice the mains frequency. A low current meter 5 with a high value series resistor is connected across the output terminals of the bridge rectifier 4 and is adapted to indicate the test voltage fed to the test channels $T_1 \ldots T_{20}$. The test voltage can be varied by means of the variable transformer 2.

One terminal of the output terminals of the bridge rectifier 4 and each of conductors $C_1 \ldots C_{20}$ under test is connected to earth and the other terminal is connected to each of the test channels $T_1 \ldots T_{20}$. We prefer to connect the negative terminal of the output terminals of the bridge rectifier 4 to each of the test channels $T_1 \ldots T_{20}$ and to connect the positive terminal to earth because, by arranging for the electrode of each channel to be at a negative potential with respect to earth, any corona losses that occur are reduced as the corona inception voltages tend to be higher than with the reverse polarity.

Each test channel $T_1 \ldots T_{20}$ includes an electrode 7 with which the advancing insulated conductor $C_1$ under test makes contact and a small capacitor 8 in series with a fault signal resistor 9 of low value, e.g. a few thousand ohms, is effectively connected across the output terminals of the bridge rectifier 4. The capacitor 8 reduces the fluctuation of the fluctuating D.C. test voltage to such an extent that the test voltage on each electrode 7 whilst no fault current is flowing is effectively a smooth D.C. voltage. The capacitor 8 is so selected that its capacitance is insufficient to maintain a smooth D.C. test voltage when a sustained fault current is flowing as would be caused by a bare portion of conductor. Thus, when sustained fault current flows due to a bare portion of conductor, the test voltage changes rapidly from smooth D.C. to fluctuating D.C. so that the fault current also fluctuates. The electrode 7 is connected to the negative terminal of the bridge rectifier 4 through a resistor 10 of a relatively high value (megohms) for limiting the fault current when a spark or short circuit occurs at the electrode on detection of a fault and a rectifier 11 for preventing a current from the smoothing capacitor 8 flowing into any of the other test channels $T_2 \ldots T_{20}$ in which a fault has been detected.

In order to prevent any interference between the test channels $T_1 \ldots T_{20}$ the high voltage lead 12 connecting the electrode 7 of a channel to the negative terminal of the bridge rectifier 4 is screened as indicated at 14 and, because the screened lead will have a capacitance to earth, a further resistor 15 is connected in the lead at the electrode to limit the fault current and shock current were the electrode to be inadvertently touched.

Across the fault signal resistor 9 of each test channel $T_1 \ldots T_{20}$ is connected a separate amplifier 17 whose output is fed into a monostable trigger unit 18 which is adapted to operate a first or pinhole relay 19 unit which actuates a signal lamp 20 and a counting mechanism 21. The monostable trigger unit 18 also operates a storage device which comprises an integrating network 22 and a level detector 23, the output of which is connected to the monostable unit and via a diode 24 to a relay unit 26. The relay unit 26 is common to all test channels $T_1 \ldots T_{20}$ and is therefore operated by any one or more of the level detectors 23 associated therewith. The relay unit 26 actuates a signal lamp 27 and a bell or buzzer 28. The diode 24 prevents the output from the level detectors in the other channels from being fed into the monostable units 18 in the test channels $T_1$.

A stabilized D.C. supply 30 for the electronic units of the detecting apparatus associated with each test channel $T_1 \ldots T_{20}$ is derived from the source of A.C. supply 1.

The operation of the apparatus is as follows: The twenty insulated electric conductors $C_1 \ldots C_{20}$ to be tested are advanced through the apparatus, one conductor per test channel. In the event of a pinhole in the insulating covering of a conductor under test in any one channel causing a short circuit or spark current to flow at the electrode 7, the resultant current pulse causes a pulse to appear across the fault signal resistor 9. The pulse across the resistor 9 is amplified and fed into the monostable unit 18 which in turn operates the first or pinhole relay unit 19 and also feeds one pulse into the integrating network 22 of the storage device. The relay unit 19 causes lamp 20 to flash momentarily and also operates the counting mechanism 21 to record the detection of a pinhole.

If, within a specified period of time dependent upon the speed of travel of the wire, the number of pulses caused by pinholes fed by the monostable unit 18 into the integrating network 22 of the storage device exceeds a predetermined maximum number, the voltage across the integrating network will have been raised to a sufficient level to operate the level detector 23. The level detector 23 causes the monostable unit 18 to be held in the "on" position so that the lamp 20 and the counting mechanism 21 remain energised and causes the unit 26 to operate. Since the monostable unit 18 is held in the "on" position, the voltage across the integrating network 22 is maintained so that the level detector 23 is held in the "on" position to cause the relay unit 26 to be maintained in the operated condition, in which condition it operates the lamp 27 and switches on the bell or buzzer 28. The lamp 27 and bell or buzzer 28 give warning of a conductor having an unacceptable number of pinholes per given length and the lamp 20 indicates the conductor of which test channel is involved.

Resetting of relay unit 26 is achieved by means of a switch 38 in a common supply lead from the stabilised D.C. supply 30 to the level detector 23 in each test channel $T_1 \ldots T_{20}$. Operation of the relay unit 26 by one test channel does not interfere with the operation of the other channels, which continue to test their respective insulated conductors, detecting and couning pinholes and locking in the "on" position if an unacceptable conductor is detected.

When a bare portion of conductor passes in contact with the electrode 7 of a test channel there is an initial fault current pulse which, as in the case of a pinhole, causes operation of the monostable unit 18 which then returns to its normal "off" position. After the initial pulse, the fault current changes to a fluctuating D.C. current and repeated triggering of the monostable unit 18 occurs for as long as the sustained fluctuating D.C. fault current continues to flow. If this fault current persists for more than a predetermined time, which time is dependent upon the speed of travel of the advancing conductor, then as in the case of a conductor with an unacceptable number of pinholes, the pulses fed into the integrating network 22 of the storage device by the monostable unit 18 raise the voltage across the network to a sufficient extent to cause operation of the relay unit 26 via diode 24. The relay unit 26 operates the lamp 27 and switches on the bell or buzzer 28 to give warning of an unacceptable length of bare conductor. As in the case of pinholes the lamp 20 indicates which test channel is involved. Should the bare portion of conductor make only intermittent contact with the electrode 7 then the monostable unit 18 will still be triggered both by fluctuating current pulses due to the inadequate capacitive smoothing and current pulses due to the intermittent sparking at the electrode, so that the relay unit 26 will still be operated.

Where relatively high test voltages and fault currents are involved the amplifier 17 in each test channel $T_1 \ldots T_{20}$ may not be required. In general whether an amplifier 17 is used or not the sensitivity of the apparatus may be such that for a fixed voltage ratio of the high voltage transformer 3 a fairly wide range of test voltages is covered. To facilitate a very wide range of test voltages, the sensitivity of the apparatus may be adjusted by a suitable sensitivity control. This sensitivity control may take the form of a variable D.C. bias applied to the amplifier 17. Such a variable D.C. bias can be obtained from a potentiometer connected across a suitable D.C. supply, for instance the stabilized D.C. supply 30 which supplies energy to the electronic units of the detecting apparatus associated with each channel $T_1 \ldots T_{20}$. In the apparatus illustrated the potentiometer comprises two pre-set variable resistors 31, 32 in series with a bias control potentiometer 33 which is mechanically coupled to the variable transformer 2 to facilitate automatic adjustment of the sensitivity with change in test voltage. Where the apparaus is required to be used over a large test voltage range the output of the high voltage transformer 3 is provided with at least one tapping, the output of the high voltage transformer being pre-selected by use of a switch 37. Change in output of the high voltage transformer 3 necessitates change in value of the resistor in series with the meter 5 and of the resistors in series with the variable potentiometer 33 and such changes can be effected by substituting a resistor 6' for the resistor 6 by means of a switch 34 and by substituting pre-set variable resistors 31', 32' for the pre-set variable resistors 31, 32 by means of switches 35 and 36. Switches 34, 35, 36 and 37 can be mechanically ganged together to form one multiple switch. This arrangement gives better meter indication at lower voltages and improves the resolution of the bias control potentiometer 33.

The lead 39 is connected to the amplifiers of each of the channels $T_2 \ldots T_{20}$, the lead 40 is connected to the level detectors of all the channels $T_2 \ldots T_{20}$ and lead 41 is connected to the electronic units of all of the channels $T_1 \ldots T_{20}$.

If desired the relay unit 19 and/or 26 may also be used to switch external circuits, for example circuits in which are connected the contactors of motors driving the capstan or other conductor haul-off devices.

The relay units 19 and 26 each consist of an electronic circuit operating an electromechanical relay but, if desired, purely electronic relay units can be employed.

Figure 2:
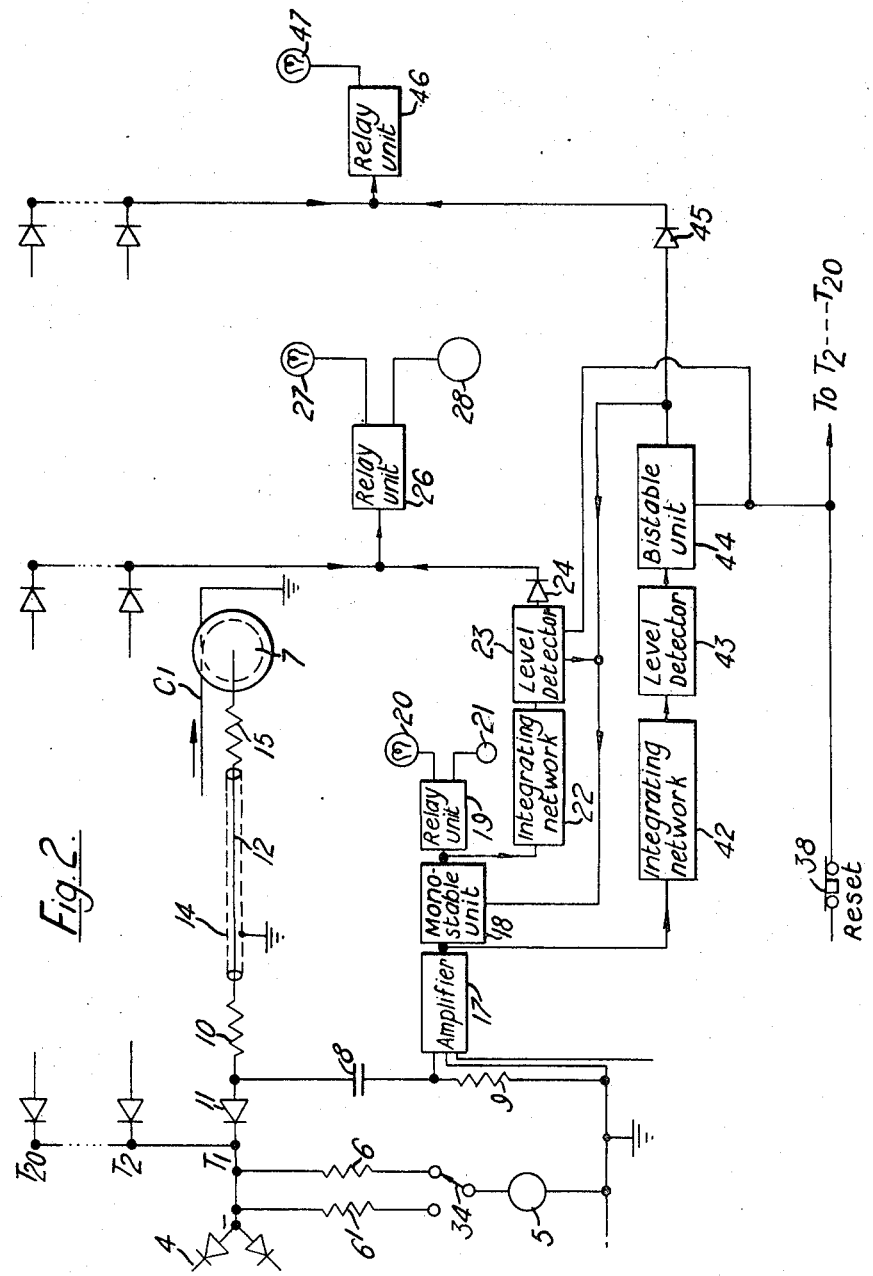

FIG. 2 shows a modification of part of the apparatus shown in and described with reference to FIG. 1 which enables the detector of each test channel to distinguish between an unsatisfactory insulated conductor having an unacceptable number of pinholes in its insulating covering and an unsatisfactory insulated conductor having an unacceptable length of bare conductor. Where appropriate, the same references have been used as are used in FIG. 1.

In each test channel $T_1 \ldots T_{20}$ of the apparatus shown in FIG. 2 the output of the amplifier 17 is fed also into a second storage device comprising an integrating network 42 and a level detector 43. The output of the level detector 43 is connected to a bistable unit 44 and through a diode 45 to a relay unit 46 which is common to all test channels $T_1 \ldots T_{20}$. The relay unit 46 actuates a signal lamp 47. The integrating network 42 has a different time constant from that of the integrating network 22 and the level detector 43 operates at a different level from that of the level detector 23 such that the second storage device is not operated by pulses due to pinholes because the voltage across the integrating network 42 does not rise sufficiently to operate the level detector 43. A continuous train of pulses due to bare wire persisting for at least a certain minimum period of time will cause the voltage across the integrating network 42 to rise sufficiently to cause the second storage device to operate. The output from the bistable unit 44 is connected to the feedback connection from the level detector 23 to the monostable unit 18, so that both storage devices can cause the monostable unit to be maintained in the "on" position.

In operation, the unmodified portion of the apparatus operates as described with reference to FIG. 1. The bistable unit 44 is normally held in the "off" position by the level detector 43 but if a fault current persists for more than a predetermined time due to a bare length of conductor the voltage across the integrating circuit 42 will rise to operate the level detector 43 which causes the bistable unit 44 to be held in the "on" position to cause the common relay unit 46 to operate and actuate the lamp 47. The bistable unit 44 will remain in the "on" position until the re-set switch 38 is operated to disconnect the D.C. supply to part of the circuit of the bistable unit 44 and part of the circuit of the level detector 23. The D.C. supply is permanently connected to all the electronic units and to those parts of the circuits of the bistable unit 44 and level detector 23 not supplied via the re-set switch 38.

It will be appreciated that the modified apparatus distinguishes between the two forms of unsatisfactory insulated conductor that are detected. If the lamp 27 and bell or buzzer 28 only are actuated then a test channel has an insulated conductor with an unsatisfactory number of pinholes. If the lamp 27 and bell or buzzer 28 and the lamp 47 are actuated then a test channel has an unsatisfactory conductor with a bare length of conductor. In both cases the lamp 20 counting mechanism 21 will signify the test channel concerned.

Figure 3:
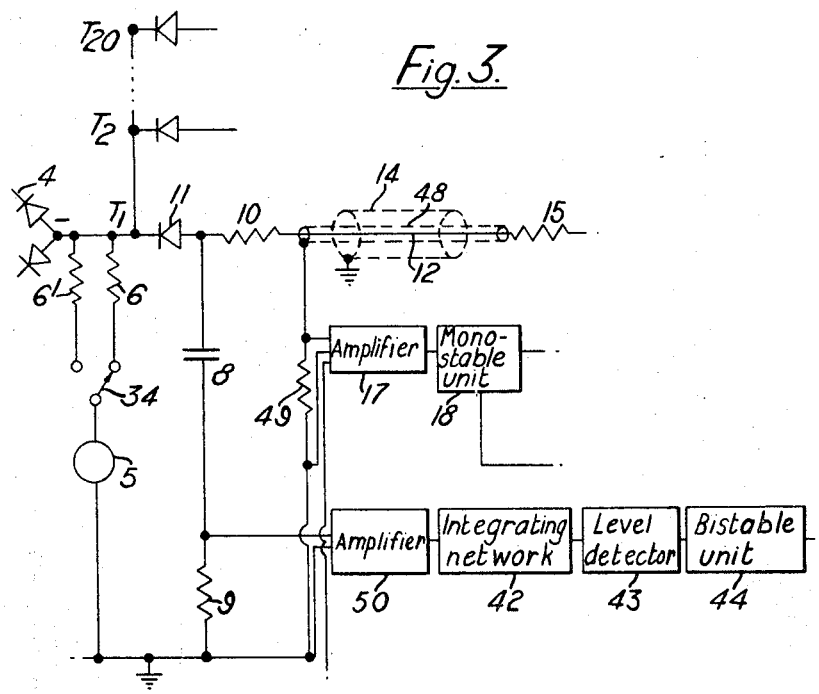

The part of the apparatus shown in FIG. 3 is a modification of the apparatus shown in FIG. 2 and incorporates separate detecting circuits for unsatisfactory conductors caused by pinholes and bare portions of conductor. Where appropriate the same references have been used as in FIGS. 1 and 2.

In the apparatus shown in FIG. 3 the high voltage lead 12 connecting the electrode 7 of a channel to the negative terminal of the bridge rectifier 4 is double screened by the provision of a second or inner screen 48. The screen 48 is connected to one end of a fault signal resistor 49 the other end of which is connected to an output terminal of the bridge rectifier 4 and the amplifier 17 is connected across the fault signal resistor 49. The capacitance between the inner screen 14 and the high voltage lead 12 is therefore used instead of the separate capacitor 8. The output of the amplifier 17 is fed only into the first storage device which now serves to detect and count pinholes only. The capacitor 8 in series with resistor 9 is still connected across the output terminals of the bridge rectifier 4 and a second storage device is now fed from the output of an amplifier 50 which is connected across the fault signal resistor 9. The second storage device serves only to detect and count pulses of a series of pulses caused by a length of bare conductor.

Since the lead capacitance and resistor 15 are of relatively low value, they have a relatively low time constant. When a pinhole is detected at the electrode 7, the lead capacitance discharges through the resistors 15 and 49 and the fault and recharges when the fault has passed. The value of the resistor 10 through which the lead capacitance is recharged is relatively high so that each of a fairly rapid succession of pinholes can be detected and counted by the first storage device in the manner described wtih reference to FIG. 1.

When pinholes occur in very rapid succession, or more particularly when a bare portion of conductor is detected, the voltage across the lead capacitance falls to such a value that the signal is too small to operate the detecting circuit of the first storage device. The time constant of the integrating network 42 and the operating level of the level detector 43 of the second storage device which is fed from the capacitor 8 is such that only the pulses due to a very rapid succession of pinholes or to a portion of bare conductor are sufficient to cause the second storage device to operate in the manner described with reference to FIG. 2. The output from the bistable unit 44 is connected to the feedback connection from the level detector 23 in the first storage device to the monostable unit 18 so that the lamp 20 and counting mechanism 21 is continuously actuated and the lamp 27 and bell or buzzer 28 common to all channels are operated. Instead of using the capacitance of the screen 48 and lead 12, a separate capacitor connected between the lead 12 and resistor 49 can be used.

Figure 4:
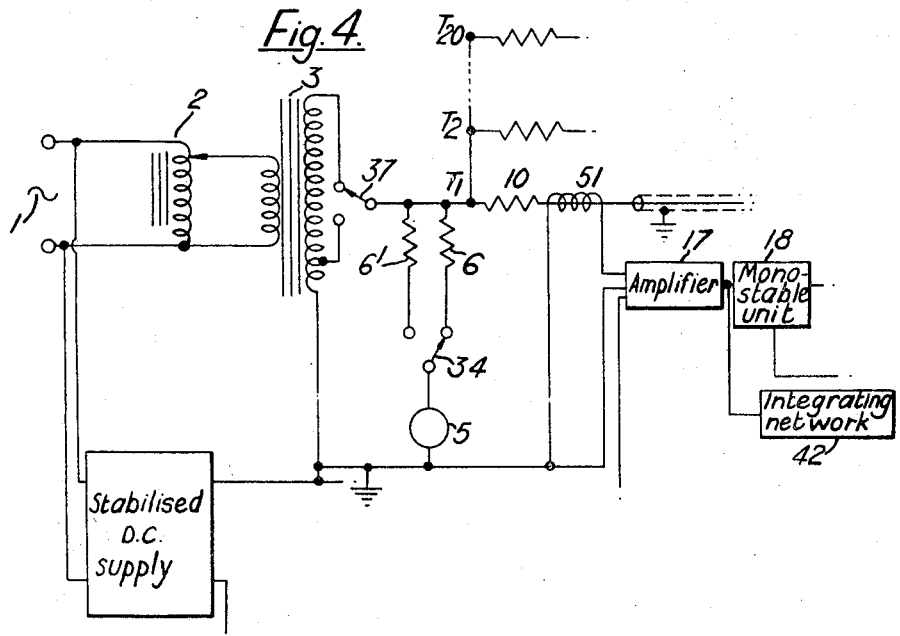

FIG. 4 illustrates the use of an A.C. source as the source of potential and is a modification of part of FIG. 2. It will be appreciated that a similar modification could be used in conjunction with the circuit of FIG. 3.

Referring to FIG. 4, it will be seen that the common rectifier 4 is omitted and that the rectifier 11 in channel T₁ and the equivalent rectifiers in the remaining channels are omitted. Fault signals are picked up by a coil 51 encircling the lead 12. Descrete pinholes cause the first relay unit (19 in FIG. 2) to operate and a rapid succession of pinholes or bare wire will cause the second relay unit (26 in FIG. 2) to operate the alarm. The part of the circuit operating the third relay unit (46 in FIG. 2) will only respond to bare wire, as described with reference to FIG. 2.

FIG. 5 is a modification of part of FIG. 3 to show how a pure D.C. source can be used in conjunction with two amplifiers, the second amplifier 52 being a D.C. amplifier.

A capacitor 53 smoothes the supply from the rectifier 4 to the extent that the amplitude of any fluctuation remaining is not substantially affected by fault currents.

The input of the amplifier 17 is taken from the junction between a capacitor 54 and a resistor 55 and is such that the amplifier will only respond to pinholes, since after the initial pulse caused by the beginning of a length of bare wire there will be no further fluctuating input from the capacitor 53 (as there is in the circuits of the previous figures) the effect will instead be that the smoothed D.C. input will fall to a lower steady value.

Similarly the D.C. input to the D.C. amplifier 52, taken from the junction between resistors 56 and 57, will fall when a bare length of wire passes over the electrode 7 and the voltage across the integrating network 42 will fall, resistor 56 being of a high value, preferably about 100 times that of the resistor 58 in the lead 12. When a predetermined length of bare wire has passed over the electrode 7 the voltage across the integrating network 42 will have fallen to such a value that the level detector 43 will operate causing the bistable unit 44 to operate and both of lamps 20 and 47 to light and remain on until the reset switch 38 is operated.

When testing enamelled wires we prefer to use as an electrode 7 a pulley wheel because with a D.C. test voltage the wire need only touch the wheel rather than be wrapped around it, thereby keeping friction and deformation of the wire down to a minimum. For more complete wire coverage two or more electrically interconnected pulley wheels may be circumferentially spaced around a wire. Alternatively other forms of contacting or non-contacting electrode that have previously been proposed for use in detecting faults in the insulating covering of insulated conductors may be used.

What we claim as our invention is:

1. Apparatus for counting pinholes and detecting bare portions in the insulating covering of an insulated electric conductor by analyzing fault current passing through the pinholes and bare portions as the conductor advances in the direction of its length past an electrode comprising
    (a) means for providing an electrical potential across the conductor and electrode which, in the absence of a fault current, is substantially constant and which causes a detectable fault current pulse to flow through any pinhole passing the electrode and causes a detectable fluctuating fault current comprising a series of pulses to flow through any bare portion passing the electrode and connected to the electrode,
    (b) means for detecting the fault current comprising
        (i) means for counting pulses caused by pinholes,
        (ii) means for counting the pulses of the series of pulses generated by the fluctuating current that flows through bare portions, and
        (iii) connected to said counting means, at least one means for indicating when pulses representing an unacceptable number of pinholes during the passage of a predetermined length of conductor and when a series of pulses representing an unacceptable length of bare conductor are received by said detecting means.

2. Apparatus as claimed in claim 1, wherein the indicating means includes at least one indicator capable of indicating when pulses representing an unacceptable number of pin holes have been received in the detector during the passage of a predetermined length of conductor and, separate therefrom, at least one indicator capable of indicating when a series of pulses representing an unacceptable length of bare conductor have been received in the detector.

3. Apparatus as claimed in claim 1, wherein electrical potential is a smoothed D.C. potential.

4. Apparatus as claimed in claim 1 wherein the detecting means comprises
    (a) a storage device for counting and recording pulses caused by a pinhole and for counting and recording the pulses of the series of pulses caused by fluctuating current caused by bare portions, and
    (b) an actuating means for causing the indicating means to actuate momentarily on flow of a fault current pulse through a pinhole and causing said pin hole counting means to record a pinhole and for actuating the indicating means continuously when an unacceptable number of pinholes in a given length of conductor or an unacceptable length of bare conductor has been recorded.

5. Apparatus as claimed in claim 4, wherein the detecting means comprises
    (a) a second storage device which is adapted to count the pulses of the series of pulses caused by fluctuating current flowing through bare portions,
    (b) a second indicating means for indicating when a series of pulses representing an unacceptable length of bare conductor have been received in the detector, and
    (c) means connecting the second storage device to the actuating means and second indicator such that when a series of pulses representing an unacceptable bare length has been received the actuating means locks and effects continuous operation of the first indicating means and the second indicating means signifies that a fault is at least one bare portion of conductor.

6. Apparatus as claimed in claim 1, wherein the means for providing an electrical potential comprises an A.C. source to which are connected circuit means for rectifying and circuit means for smoothing said circuits cooperating such that, when no fault current is flowing, a smoothed D.C. voltage is provided and, when a fault current is flowing, a fluctuating D.C. voltage is provided.

7. Apparatus as claimed in claim 6 wherein the smoothing circuit comprises a capacitor which has a capacitance insufficient to maintain a smoothed D.C. voltage when a detectable current flows through a pinhole or bare portion in the insulating covering.

8. Apparatus as claimed in claim 7, wherein the electrodes of the capacitor comprise a high voltage lead connecting the electrode to the potential source and a screen therefor.

9. Apparatus for counting pinholes and detecting bare portions in the insulating coverings of a plurality of insulated electric conductors by analyzing fault current passing through the pinholes and bare portions as each conductor advances in the direction of its length, which apparatus comprises
   (a) a plurality of test channels, one for each conductor, each test channel comprising an electrode past which an insulated conductor moves,
   (b) a common source of electrical potential connected to each electrode and its associated conductor which, in the absence of a fault current, will be substantially constant and which will cause a detectable fault current pulse to flow through any pinhole passing the electrode and will cause a detectable fluctuating fault current comprising a series of pulses to flow through any bare portion passing the electrode and, connected to each electrode,
   (c) a separate fault current detector for each test channel comprising
       (i) means for counting the number of pulses caused by pinholes,
       (ii) means for counting the pulses of the series of pulses generated by the fluctuating current that flows through bare portions, and
       (iii) connected to said counting means, at least one means for indicating when pulses representing an unacceptable number of pin holes during the passage of a predetermined length of the conductor and when a series of pulses representing an unacceptable length of bare conductor are received in the detector.

10. Apparatus as claimed in claim 9, wherein an indicator is connected to the means in all the test channels for counting the number of pulses caused by pinholes and for counting the pulses of the series of pulses generated by the fluctuating current flowing through bare portions that is capable of indicating when an insulated conductor passing through any test channel has been found to be unacceptable.

References Cited
UNITED STATES PATENTS

| | | | |
|---|---|---|---|
| 2,701,336 | 2/1955 | Anderson | 324—54 |
| 2,731,202 | 1/1956 | Pike | 324—71UX |
| 2,894,204 | 7/1959 | Gambrill | 324—54 |
| 3,082,871 | 3/1963 | Duncan | 324—54 |
| 3,281,675 | 10/1966 | Shillington | 324—54 |
| 3,323,701 | 6/1967 | Gurski et al. | 324—54X |
| 3,364,421 | 1/1968 | Bullwinkel | 324—54 |
| 3,389,789 | 6/1968 | Watson et al. | 324—54UX |
| 3,411,078 | 11/1968 | Hartman | 324—54 |

GERARD R. STRECKER, Primary Examiner